(12) United States Patent
Jaradi et al.

(10) Patent No.: US 12,434,660 B2
(45) Date of Patent: Oct. 7, 2025

(54) LOAD-LIMITING SEATBELT RETRACTOR

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 208 days.

(21) Appl. No.: 18/319,533

(22) Filed: May 18, 2023

(65) Prior Publication Data
US 2024/0383438 A1 Nov. 21, 2024

(51) Int. Cl.
*B60R 22/42* (2006.01)
*B60R 22/28* (2006.01)
*B60R 22/38* (2006.01)

(52) U.S. Cl.
CPC .............. *B60R 22/42* (2013.01); *B60R 22/38* (2013.01); *B60R 22/28* (2013.01); *B60R 2022/286* (2013.01); *B60R 2022/288* (2013.01)

(58) Field of Classification Search
CPC ... B60R 22/28; B60R 22/42; B60R 2022/288; B60R 2022/286
See application file for complete search history.

(56) References Cited

U.S. PATENT DOCUMENTS

| | | | | |
|---|---|---|---|---|
| 4,323,205 A | * | 4/1982 | Tsuge | B60R 22/3413 |
| | | | | 280/805 |
| 5,314,138 A | * | 5/1994 | Watanabe | B60R 22/42 |
| | | | | 242/381.1 |
| 6,105,893 A | | 8/2000 | Schmidt et al. | |
| 6,739,541 B2 | * | 5/2004 | Palliser | B60R 22/3413 |
| | | | | 242/379.1 |
| 10,759,381 B2 | | 9/2020 | Jaradi et al. | |
| 11,046,285 B2 | | 6/2021 | Jaradi et al. | |
| 2013/0200195 A1 | | 8/2013 | Ono et al. | |
| 2018/0118156 A1 | * | 5/2018 | Suga | B60R 22/3413 |
| 2021/0229624 A1 | | 7/2021 | Jaradi et al. | |

FOREIGN PATENT DOCUMENTS

| CN | 101602355 A | 12/2009 |
|---|---|---|
| CN | 1061602354 A | 12/2009 |

* cited by examiner

*Primary Examiner* — Anna M Momper
*Assistant Examiner* — Ermia E. Melika
(74) *Attorney, Agent, or Firm* — Frank A. MacKenzie; Brooks Kushman P.C.

(57) ABSTRACT

A restraint system includes a retractor housing, a webbing spool rotatably coupled to the retractor housing and defining an axis of rotation, a wire spool lockable to the webbing spool, a die fixed relative to the retractor housing, and a wire fixed to the wire spool and engaged with the die.

21 Claims, 5 Drawing Sheets

LOAD-LIMITING SEATBELT RETRACTOR

BACKGROUND

Vehicles include restraint systems. The restraint system for a seat of a vehicle is typically a three-point harness. The restraint system includes an anchor, a retractor, and a buckle. The anchor attaches one end of the webbing to a frame of the seat or vehicle body. The other end of the webbing feeds into the retractor, which may include a spool that extends and retracts the webbing. A clip slides freely along the webbing and, when engaged with the buckle, divides the webbing into a lap band and a shoulder band.

DETAILED DESCRIPTION

Figure 1:
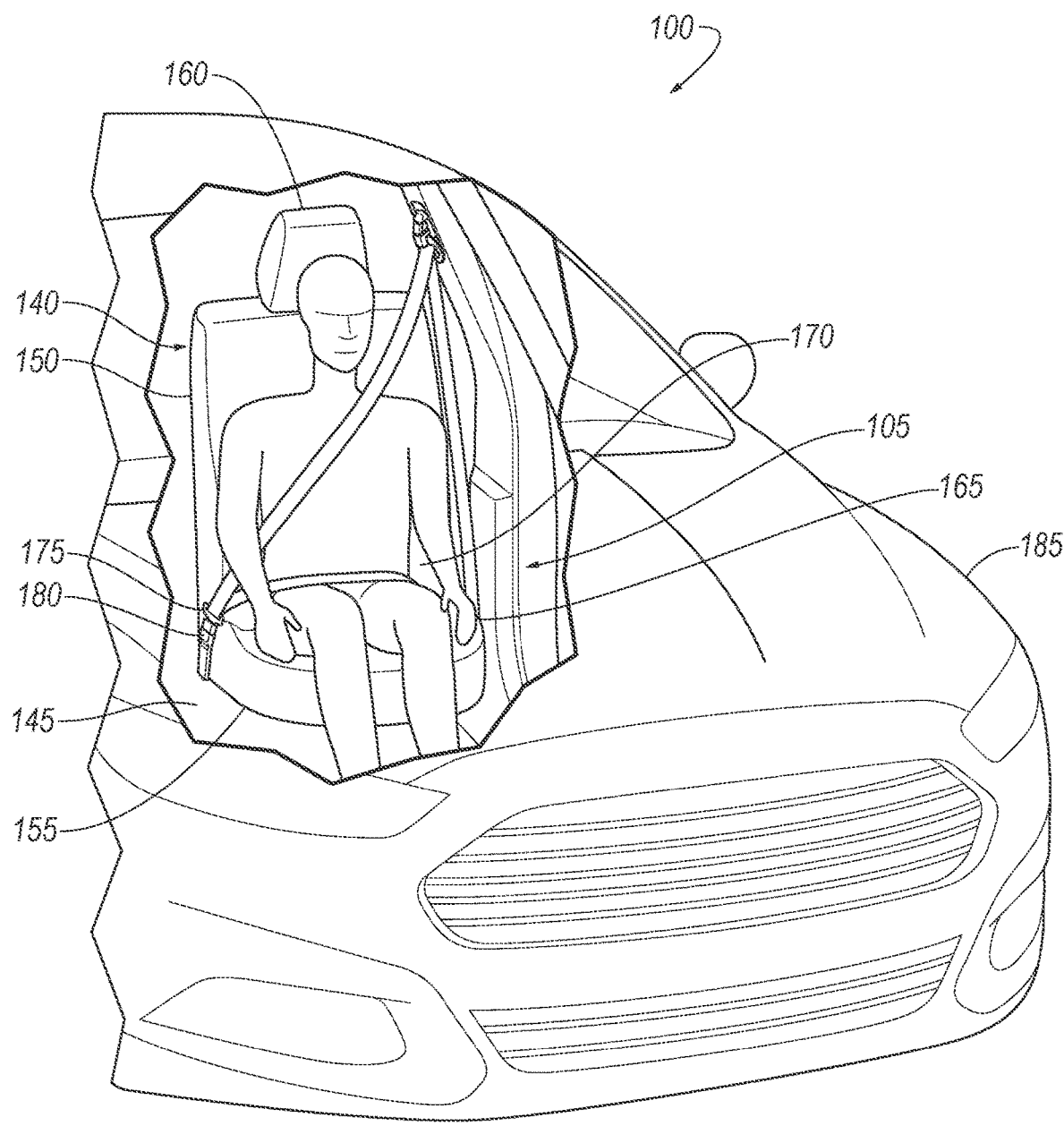
FIG. 1 is a perspective view of a portion of an example vehicle with a passenger compartment exposed for illustration.

A restraint system includes a retractor housing, a webbing spool rotatably coupled to the retractor housing and defining an axis of rotation, a wire spool lockable to the webbing spool, a die fixed relative to the retractor housing, and a wire fixed to the wire spool and engaged with the die.

In an example, the die may include an inlet and an outlet, and the wire may include a first segment extending from the wire spool to the outlet of the die and a second segment extending from the inlet of the die. In a further example, the second segment of the wire may have a cross-sectional area greater than a cross-sectional area permitted through the die.

In another further example, the die may be sized to squeeze the second segment of the wire to a smaller cross-sectional area as the second segment of the wire passes through the die.

In another further example, the wire may include a third segment extending from the second segment, and the third segment may have a different cross-sectional area than the second segment. In a yet further example, the die may be sized to squeeze the second segment of the wire to a smaller cross-sectional area as the second segment of the wire passes through the die and to squeeze the third segment of the wire to a smaller cross-sectional area as the third segment of the wire passes through the die.

In another further example, the wire may include a bulged segment sized to prevent passage of the bulged segment through the die.

In another further example, the restraint system may further include a guide fixed relative to the retractor housing, and the second segment of the wire may be positioned in the guide. In a yet further example, the guide may be arranged to locate the second segment of the wire in a same plane as the first segment of the wire. In a still yet further example, the same plane may be orthogonal to the axis of rotation.

In another further example, the wire may be unattached from the inlet of the die through an end of the wire.

In an example, rotation of the wire spool may tend to pull the wire through the die.

In an example, the restraint system may further include a locking mechanism movable between an engaged state and a disengaged state, the locking mechanism in the engaged state may lock the webbing spool to the wire spool, and the locking mechanism in the disengaged state may permit rotation of the webbing spool relative to the wire spool. In a further example, the locking mechanism may include a locking member movable between a disengaged position spaced from the wire spool and an engaged position meshed with the wire spool. In a still further example, the locking member may be arranged to move from the disengaged position radially outward to the engaged position.

In another still further example, the locking member may be arranged to move from the disengaged position to the engaged position upon rotation of the webbing spool above a pretuned angular speed.

In an example, the webbing spool may include a slot, and the restraint system may further include webbing extending through the slot.

In an example, the restraint system may further include a spring coupled to the webbing spool and coupled to the retractor housing, and the spring may be a coil spring.

In an example, the restraint system may further include a spring coupled to the webbing spool and coupled to the retractor housing, and the spring may be preloaded to apply a torque to the webbing spool in a retractive direction. In a further example, rotation of the wire spool in an extractive direction opposite the retractive direction may tend to pull the wire through the die.

With reference to the Figures, wherein like numerals indicate like parts throughout the several views, a restraint system 105 of a vehicle 100 includes a retractor housing 110, a webbing spool 115 rotatably coupled to the retractor housing 110 and defining an axis A of rotation, a wire spool 120 lockable to the webbing spool 115, a die 125 fixed relative to the retractor housing 110, and a wire 130 fixed to the wire spool 120 and engaged with the die 125.

The restraint system 105 provides load limiting in a highly tunable manner. In a load-limiting situation (e.g., certain impacts to the vehicle 100), the wire spool 120 can be locked to the webbing spool 115 so that the wire spool 120 rotates together with the webbing spool 115, and payout of webbing 135 from the webbing spool 115 thereby pulls the wire 130 through the die 125, e.g., via winding the wire 130 around the wire spool 120. The payout of the webbing 135 is resisted by the force of the die 125 reducing a cross-sectional area of the wire 130. The force exerted by the die 125 can depend on the cross-sectional area of the wire 130 feeding into the die 125, with the force increasing with the cross-sectional area. Because the cross-sectional area of the wire 130 can vary along a length of the wire 130, the wire 130 can be designed for different patterns of progressive load-limiting, digressive load-limiting, or a combination. The load limiting can be tuned differently for different seats 140 of the vehicle 100. Moreover, the wire spool 120, wire 130, and die 125 may replace a torsion bar, or be implemented together with a torsion bar.

With reference to FIG. 1, the vehicle 100 may be any passenger or commercial automobile such as a car, a truck, a sport utility vehicle, a crossover, a van, a minivan, a taxi, a bus, etc.

The vehicle 100 includes a passenger compartment 145 to house occupants, if any, of the vehicle 100. The passenger compartment 145 includes one or more of the seats 140 disposed in a front row of the passenger compartment 145 and one or more of the seats 140 disposed in a second row behind the front row. The passenger compartment 145 may also include seats 140 in a third-row at a rear of the passenger compartment 145. The position and orientation of the seats 140 and components thereof may be adjustable by an occupant. The rest of this description discusses the restraint system 105 for one seat 140, but multiple or all seats 140 in the passenger compartment 145 can each have a restraint system 105 as described herein. The seat 140 is shown to be a bucket seat, but the seat 140 may be another type.

The seat 140 may include a seat back 150, a seat bottom 155, and a head restraint 160. The head restraint 160 may be supported by the seat back 150 and may be stationary or movable relative to the seat back 150. The seat back 150 may be supported by the seat bottom 155 and may be stationary or movable relative to the seat bottom 155. The seat back 150, the seat bottom 155, and/or the head restraint 160 may be adjustable in multiple degrees of freedom. Specifically, the seat back 150, the seat bottom 155, and/or the head restraint 160 may themselves be adjustable, in other words, adjustable components within the seat back 150, the seat bottom 155, and/or the head restraint 160, and/or may be adjustable relative to each other.

The restraint system 105 includes a retractor 165, the webbing 135 retractably payable from the retractor 165, an anchor 170 coupled to the webbing 135, and a clip 175. The clip 175 may be adjustable along the webbing 135 and may selectively engage a buckle 180 fixed relative to the seat 140. The restraint system 105 is a vehicle safety device designed to secure an occupant against harmful movement that may result during a collision or a sudden stop.

Figure 2:
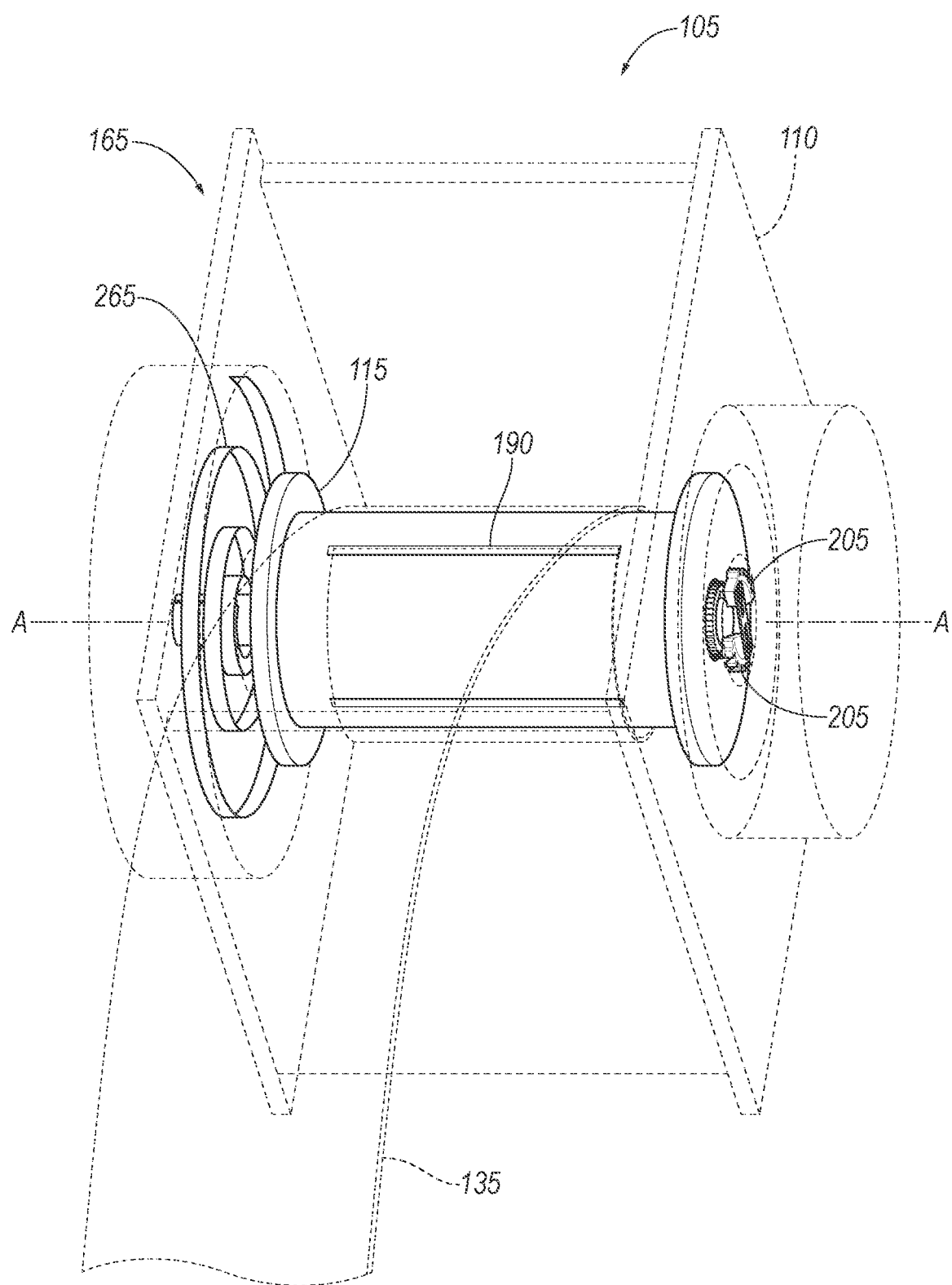
FIG. 2 is a perspective view of an example retractor of a restraint system of the vehicle with a wire assembly and part of a locking mechanism removed for illustration.

The anchor 170 attaches one end of the webbing 135 relative to a vehicle body 185 of the vehicle 100, e.g., to the seat 140. The other end of the webbing 135 feeds into the retractor 165 and is attached to the webbing spool 115, with the webbing 135 wound around the webbing spool 115 beginning at that end (as shown in FIG. 2). The webbing 135 can be formed of a fabric in the shape of a strap. The clip 175 slides freely along the webbing 135 and, when engaged with the buckle 180, divides the webbing 135 into a lap band and a shoulder band. The restraint system 105 of FIG. 1 is a three-point harness, but the restraint system 105 may, alternatively, include another arrangement.

The retractor 165 can be attached to the vehicle body 185 of the vehicle 100, e.g., to a pillar, e.g., to a middle pillar in the instance the seat 140 is a front seat (as shown in FIG. 1), to a rear pillar when the seat 140 is a rear seat, etc. The retractor 165 may alternatively be mounted to the seat 140.

With reference to FIG. 2, the retractor 165 includes the retractor housing 110. The retractor housing 110 may be formed of metal or plastic. The retractor housing 110 may be mounted to the vehicle body 185 of the vehicle 100, e.g., to the pillar or the seat 140.

The retractor 165 includes the webbing spool 115. The webbing spool 115 is rotatably coupled to the retractor housing 110. The webbing spool 115 can freely rotate relative to the retractor housing 110, and is fixed to the retractor housing 110 in all other degrees of freedom. The webbing spool 115 can be cylindrical in shape. The webbing spool 115 defines the axis A, about which the webbing spool 115 rotates. The webbing spool 115 extends along the axis A from a first end to a second end. The webbing spool 115 may include flanges at the first end and at the second end.

The webbing spool 115 can be adapted to receive the webbing 135, for example, by including a slot 190 and permitting the webbing 135 to wind around an outside of the webbing spool 115 starting from the slot 190. The slot 190 is elongated parallel to the axis A. The webbing 135 extends from outside the webbing spool 115 through the slot 190. The webbing 135 extends from the slot 190 in a circumferential direction and is wound around the webbing spool 115.

The retractor 165 includes a spring 265. The spring 265 is coupled to the webbing spool 115 and to the retractor housing 110. The spring 265 is preloaded to apply a torque to the webbing spool 115 in a retractive direction, i.e., a direction tending to retract the webbing 135. The spring 265 may be loaded in tension or compression when the webbing 135 is fully retracted, and the spring 265 may be further loaded in either tension or compression when the webbing 135 is extracted from the webbing spool 115. Thus, the spring 265 exerts a torque in the retractive direction. The spring 265 may be a coil spring, which is suitable for rotational biasing and packages well in the retractor 165, or any other suitable type of spring.

Figure 3A:
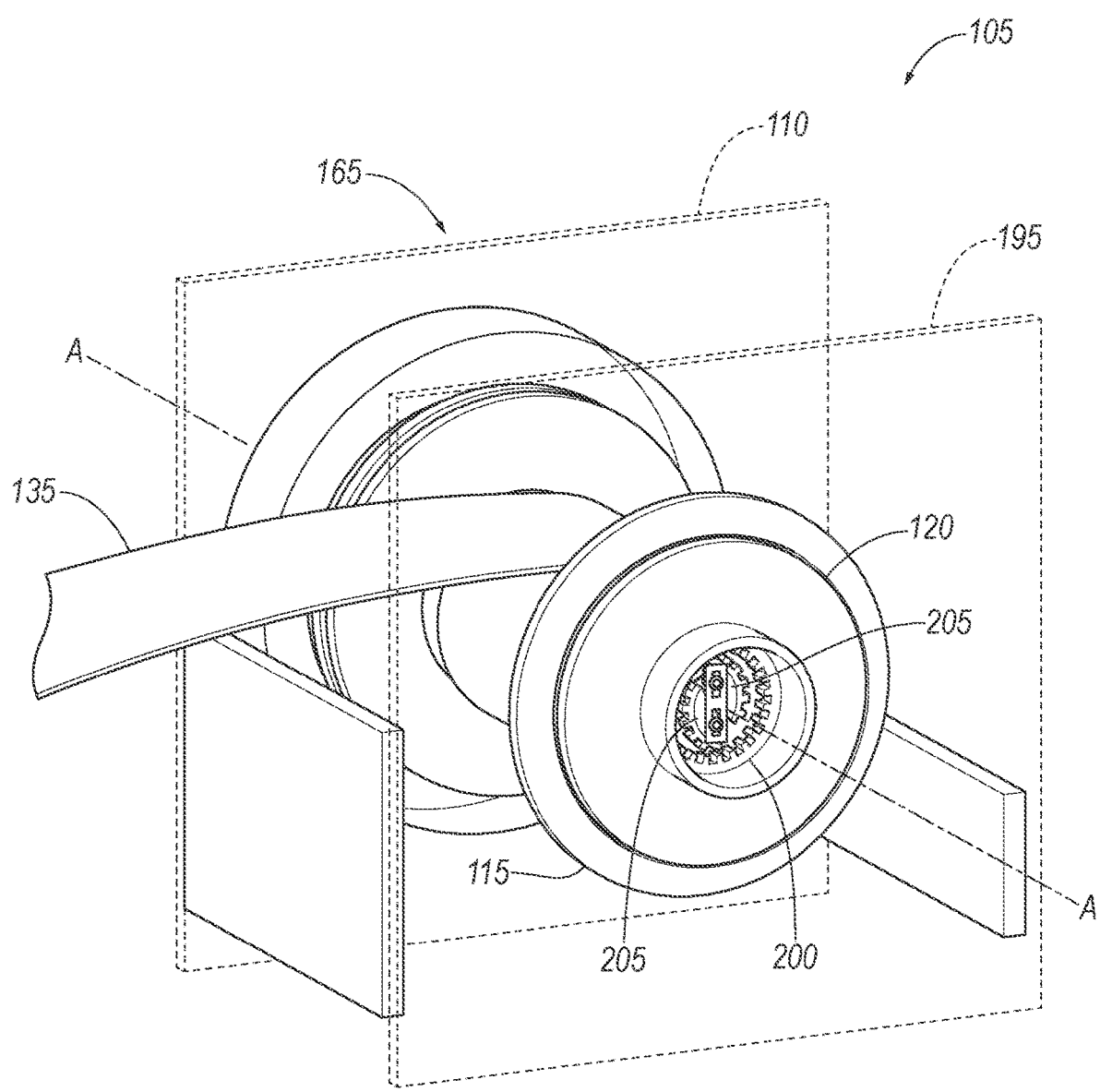
FIG. 3A is a perspective view of the retractor with the locking mechanism in a disengaged state and part of the wire assembly removed for illustration.
Figure 3B:
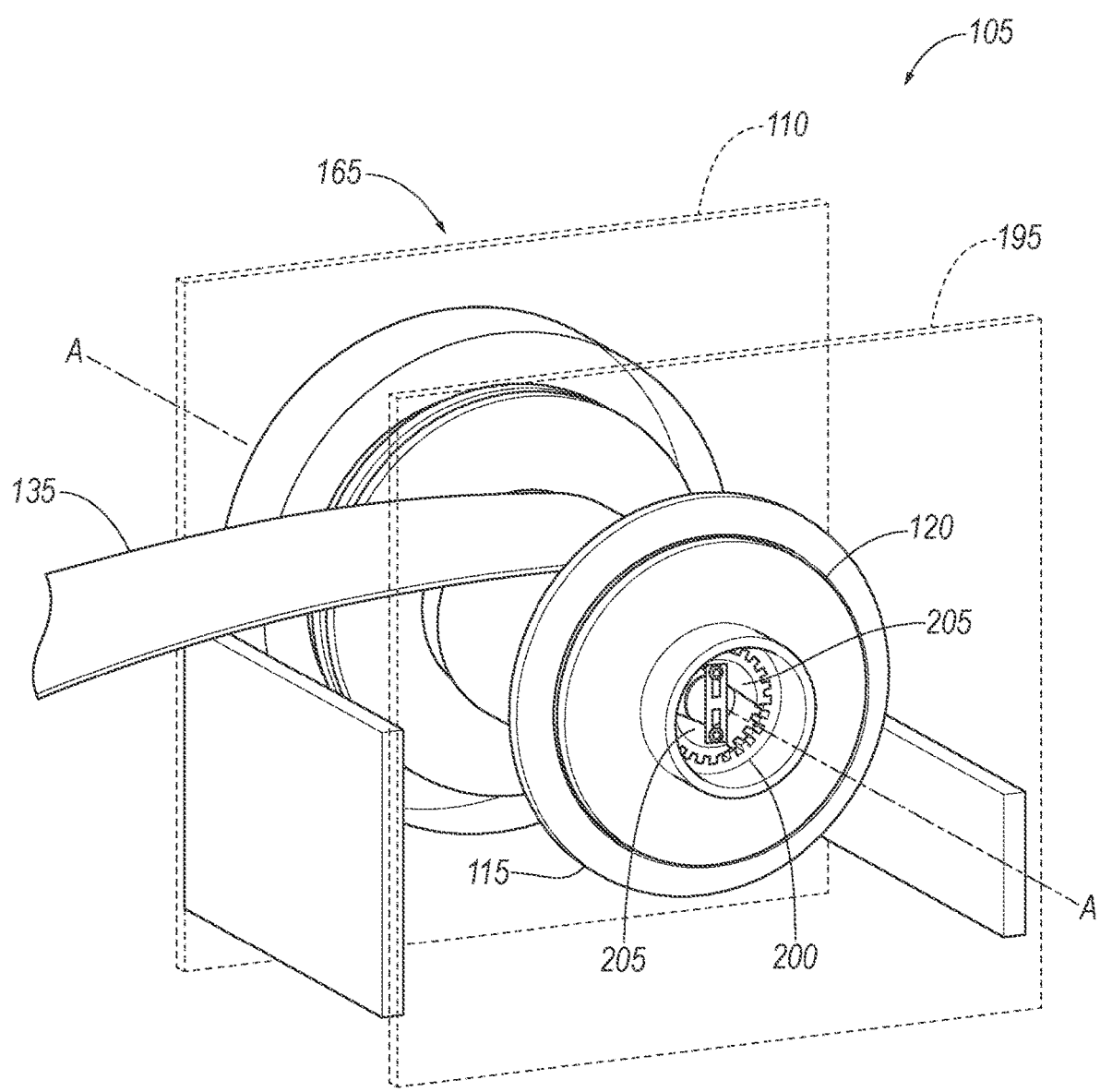
FIG. 3B is a perspective view of the retractor with the locking mechanism in an engaged state and part of the wire assembly removed for illustration.
Figure 4:
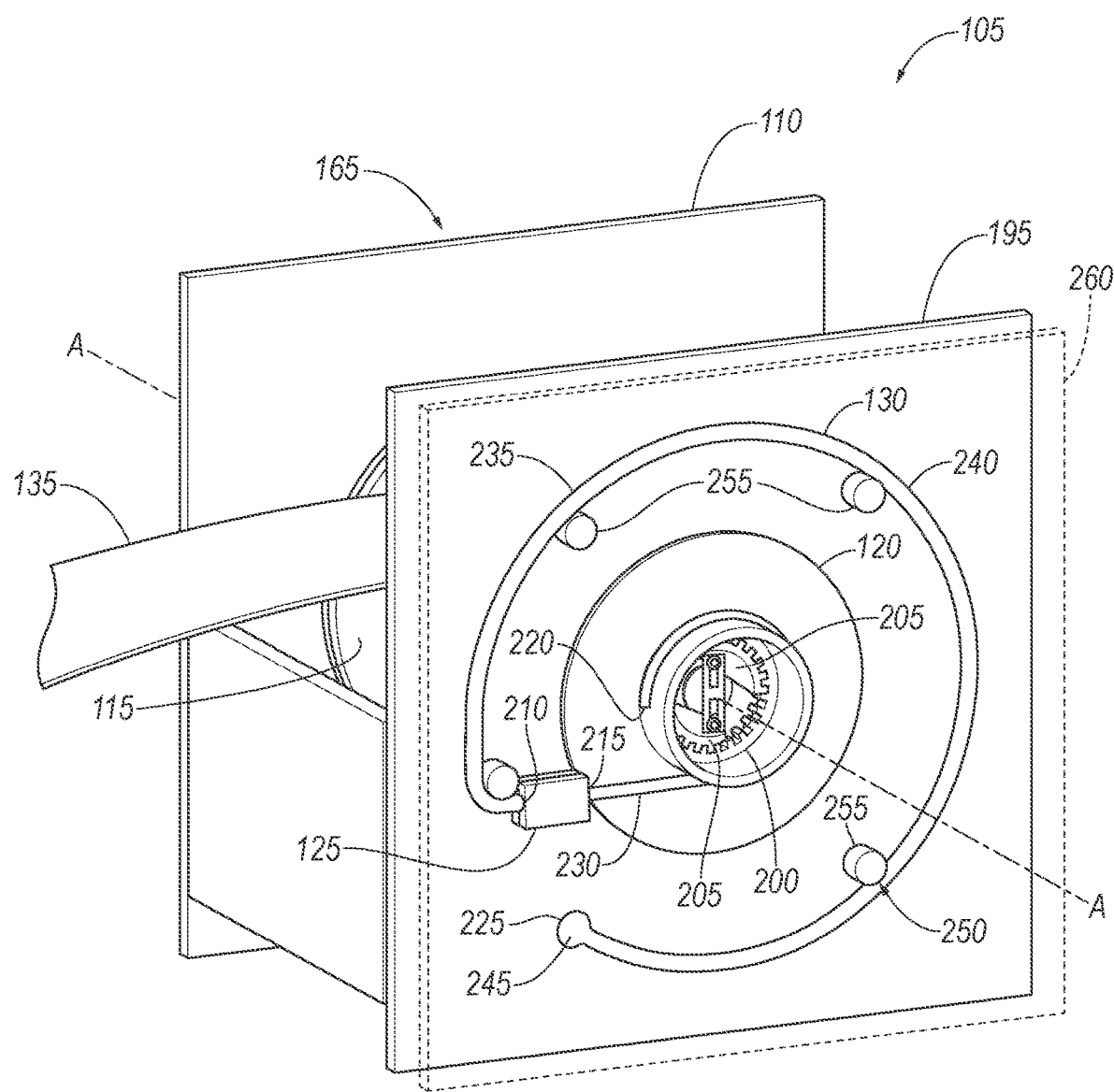
FIG. 4 is a perspective view of the retractor with the wire assembly.

With reference to FIGS. 3A-B, the retractor 165 includes the wire spool 120. The wire spool 120 is rotatably coupled to the retractor housing 110. The wire spool 120 can freely rotate relative to the retractor housing 110, and is fixed to the retractor housing 110 in all other degrees of freedom. The wire spool 120 can be cylindrical in shape. The wire spool 120 is centered on the axis A, about which the wire spool 120 rotates. The wire spool 120 may be positioned in series with the webbing spool 115 along the axis A, e.g., next to the webbing spool 115. A first wall 195 of the retractor housing 110 may be positioned between the wire spool 120 and the webbing spool 115 along the axis A.

The wire spool 120 is lockable to the webbing spool 115. For example, the retractor 165 may be an emergency locking retractor (ELR). The retractor 165 includes a locking mechanism 200 movable between an engaged state and a disengaged state. In the engaged state, the locking mechanism 200 locks the webbing spool 115 to the wire spool 120, i.e., fixing the webbing spool 115 relative to the wire spool 120. In the disengaged state, the locking mechanism 200 permits rotation of the webbing spool 115 relative to the wire spool 120, e.g., when paying out webbing 135. For example, the locking mechanism 200 may include one or more locking members 205 slidingly or pivotally attached to the webbing spool 115 to permit radially outward movement relative to the webbing spool 115. Each locking member 205 is movable between a disengaged position spaced from the wire spool 120 and an engaged position meshed with the wire spool 120. For example, each locking member 205 may include a plurality of teeth engageable with corresponding recesses of the wire spool 120 when the locking member 205 moves radially outward. Each locking member 205 may be arranged to move from the disengaged position radially outward to the engaged position. The locking members 205 when engaged prevent rotational movement by the wire spool 120 relative to the webbing spool 115.

The locking members 205 are configured to move from the disengaged position to the engaged position in response to sudden deceleration of the vehicle 100. For example, each locking member 205 is arranged to move from the disengaged position to the engaged position upon rotation of the webbing spool 115 above a pretuned angular speed, e.g., as a centrifugal effect. The pretuned angular speed may be chosen to be lower than a typical payout angular speed in a sudden deceleration and higher than a typical payout speed when being pulled by the operator. Alternatively, the retractor 165 may include an activation sensor (not shown) that senses sudden deceleration of the vehicle 100 and triggers activation of the locking mechanism 200 to engage the wire spool 120, i.e., to move the locking mechanism 200 from the disengaged state to the engaged state. The activation sensor may be in communication with the locking mechanism 200, either directly or indirectly through a controller (not shown). The activation sensor may be located in the retractor 165 or elsewhere in the vehicle 100. In the retractor 165, the activation sensor may be, for example, a weighted pendulum, a centrifugal clutch, or any other suitable type. In the vehicle 100 outside the retractor 165, the activation sensor may be, for example, post-contact sensors such as accelerometers, pressure sensors, and contact switches; pre-impact sensors such as radar, LIDAR, and vision-sensing systems; or any other suitable type. The vision systems may include one or more cameras, CCD image sensors, CMOS image sensors, etc.

The retractor 165 includes the die 125. The die 125 is fixed relative to the retractor housing 110, e.g., fixedly mounted to the first wall 195 of the retractor housing 110 on a same side of the first wall 195 as the wire spool 120. The die 125 is shaped to subject the wire 130 to a drawing process. The term "drawing" is used in its manufacturing sense as a forming process in which a work piece is pulled through a die to reduce the cross-sectional area and/or change the cross-sectional shape of the work piece, resulting in an object with a constant cross-sectional profile along the length of the object, e.g., wire drawing. The die 125 includes an inlet 210 and an outlet 215. The wire 130 is engaged with the die 125 to enter the inlet 210 of the die 125 and exit the outlet 215 of the die 125. The die 125 may be sized to squeeze the wire 130 to a smaller cross-sectional area as the wire 130 passes through the die 125 from the inlet 210 to the outlet 215, i.e., the wire 130 has a smaller cross-sectional area when exiting the die 125 than when entering the die 125, e.g., a smaller diameter.

The retractor 165 includes the wire 130. The wire 130 is fixed to the wire spool 120 and engaged with the die 125. The wire 130 may be elongated from a first end 220 fixed to the wire spool 120 to the outlet 215 of the die 125, through the die 125 from the outlet 215 to the inlet 210, and out of the inlet 210 away from the die 125 to a second end 225. The rotation of the wire spool 120, e.g., together with the webbing spool 115 in an extractive direction, tends to pull the wire 130 through the die 125, by winding the wire 130 around the wire spool 120 starting at the first end 220 of the wire 130 and thereby applying tension to the wire 130 from the wire spool 120 to the die 125. The wire 130 may be unattached from the inlet 210 of the die 125 through the second end 225 of the wire 130. In other words, the wire 130 is free from the inlet 210 of the die 125 through the second end 225 of the wire 130. Thus, tension is not being applied to the portion of the wire 130 extending from the inlet 210 of the die 125 to the second end 225.

The wire 130 includes a plurality of segments 230, 235, 240, including at least a first segment 230 and a second segment 235. The first segment 230 extends from the wire spool 120, i.e., from the first end 220 of the wire 130, to the outlet 215 of the die 125. The second segment 235 extends from the inlet 210 of the die 125. The wire 130 may further include a third segment 240 extending from the second segment 235 and possibly other segments extending in series from the third segment 240. The segments 230, 235, 240 may have different cross-sectional areas, as will be described below.

The second segment 235, third segment 240, etc. may have cross-sectional areas greater than a cross-sectional area permitted through the die 125. In other words, the die 125 is sized to squeeze the second segment 235 of the wire 130 to a smaller cross-sectional area as the second segment 235 of the wire 130 passes through the die 125, to squeeze the third segment 240 of the wire 130 to a smaller cross-sectional area as the third segment 240 of the wire 130 passes through the die 125, etc. The third segment 240 has a different cross-sectional area than the second segment 235, and the other segments if present may also have different cross-sectional areas. For example, the second segment 235, third segment 240, etc. may have different constant cross-sectional areas. For another example, the cross-sectional areas may continuously change along the lengths of the second segment 235, third segment 240, etc., and the ranges of the cross-sectional areas for segments 230, 235, 240 may not overlap with each other. The change in cross-sectional area between the second segment 235 and the third segment 240 and with other segments may provide a change in the force resisting the payout of the webbing 135, thus providing progressive or digressive load limiting. The wires 130 in different restraint systems 105 for different seats 140 in the passenger compartment 145 may have different cross-sectional areas and/or lengths for equivalent segments 230, 235, 240 of the wires 130, permitting customization of the load limiting based on seat location.

The wire 130 may further include a bulged segment 245 at the second end 225, i.e., on the opposite end of the second segment 235, third segment 240, etc. from the die 125. The bulged segment 245 is sized to prevent passage of the bulged segment 245 through the die 125, e.g., may have a significantly greater cross-sectional area than any of the segments 235, 240. For example, the bulged segment 245 may be a knotted portion of the wire 130. The bulged segment 245 may thus provide a maximum extent to the payout of the webbing 135 during load limiting.

The retractor 165 may include a guide 250 fixed relative to the retractor housing 110. The guide 250 is arranged to channel movement of the wire 130 into the die 125, and the shape of the guide 250 as described herein may prevent snags, knotting, twisting, etc. The second segment 235, third segment 240, etc. of the wire 130 may be positioned in the guide 250. The guide 250 may be arranged to locate the second segment 235, third segment 240, etc. in a same plane as the first segment 230 of the wire 130. The plane may be orthogonal to the axis A. For example, the guide 250 may be formed from the first wall 195 of the retractor housing 110 and one or more obstructions 255 extending from the first wall 195 parallel to the axis A. For example, the obstructions 255 may be pegs as shown, a semicircular or spiral wall, etc. The wire 130 extends in a circumferential direction radially outside the obstructions 255 relative to the axis A. The guide 250 may further include a containment wall 260 on an opposite side of the obstructions 255 as the first wall 195 along the axis A. The containment wall 260 may extend radially outward relative to the axis A, thereby blocking the wire 130 from slipping off of the obstructions 255. The containment wall 260 may be, e.g., a wall parallel to the first wall 195 or a lip or lips on the obstructions 255.

In the event of certain sudden decelerations of the vehicle 100, a torso of the occupant sitting in the seat 140 may move forward. Force from the occupant's torso pulls on the shoulder band, which exerts a force on the webbing 135 tending to extract the webbing 135 from the retractor 165, i.e., unwind the webbing spool 115, i.e., exert a torque on the webbing spool 115 in an extractive direction. The webbing spool 115 may rotate with sufficient speed that the locking mechanism 200 moves from the disengaged position to the engaged position. The wire spool 120 may thereby be locked to the webbing spool 115 and begin rotating with the webbing spool 115. The rotation of the wire spool 120 winds the first segment 230 of the wire 130 around the wire spool 120, thereby pulling the wire 130 through the die 125. The second segment 235, third segment 240, etc. may be pulled through the die 125. The drawing process exerted on the second segment 235, third segment 240, etc. may resist the extraction of the webbing 135 while limiting the quantity of force resisting the extraction. The different segments 235, 240 may provide different resisting forces because of their different cross-sectional areas. The extraction of the webbing 135 may be stopped by the bulged segment 245 reaching the inlet 210 of the die 125.

The disclosure has been described in an illustrative manner, and it is to be understood that the terminology which has been used is intended to be in the nature of words of description rather than of limitation. The adjectives "first," "second." "third," etc. are used throughout this document as identifiers and are not intended to signify importance, order, or quantity. Many modifications and variations of the present disclosure are possible in light of the above teachings, and the disclosure may be practiced otherwise than as specifically described. Operations, systems, and methods described herein should always be implemented and/or performed in accordance with an applicable owner's/user's manual and/or safety guidelines.

What is claimed is:

1. A restraint system comprising:
   a retractor housing;
   a webbing spool rotatably coupled to the retractor housing and defining an axis of rotation;
   a wire spool lockable to the webbing spool;
   a die fixed relative to the retractor housing; and
   a wire fixed to the wire spool and engaged with the die;
   wherein the die includes an inlet and an outlet;
   the wire includes a first segment extending from the wire spool to the outlet of the die and a second segment extending from the inlet of the die; and
   the second segment of the wire has a cross-sectional area greater than a cross-sectional area permitted through the die.

2. The restraint system of claim 1, wherein the die is sized to squeeze the second segment to a smaller cross-sectional area of the wire as the second segment of the wire passes through the die.

3. The restraint system of claim 1, wherein the wire includes a third segment extending from the second segment, and the third segment has a different cross-sectional area than the second segment.

4. The restraint system of claim 3, wherein the die is sized to squeeze the second segment of the wire to a smaller cross-sectional area as the second segment of the wire passes through the die and to squeeze the third segment of the wire to a smaller cross-sectional area as the third segment of the wire passes through the die.

5. The restraint system of claim 1, wherein the wire includes a bulged segment sized to prevent passage of the bulged segment through the die.

6. The restraint system of claim 1, further comprising a guide fixed relative to the retractor housing, wherein the second segment of the wire is positioned in the guide.

7. The restraint system of claim 6, wherein the guide is arranged to locate the second segment of the wire in a same plane as the first segment of the wire.

8. The restraint system of claim 7, wherein the same plane is orthogonal to the axis of rotation.

9. The restraint system of claim 1, wherein the wire is unattached from the inlet of the die through an end of the wire.

10. The restraint system of claim 1, wherein rotation of the wire spool tends to pull the wire through the die.

11. The restraint system of claim 1, further comprising a locking mechanism movable between an engaged state and a disengaged state, wherein the locking mechanism in the engaged state locks the webbing spool to the wire spool, and the locking mechanism in the disengaged state permits rotation of the webbing spool relative to the wire spool.

12. The restraint system of claim 11, wherein the locking mechanism includes a locking member movable between a disengaged position spaced from the wire spool and an engaged position meshed with the wire spool.

13. The restraint system of claim 12, wherein the locking member is arranged to move from the disengaged position radially outward to the engaged position.

14. The restraint system of claim 12, wherein the locking member is arranged to move from the disengaged position to the engaged position upon rotation of the webbing spool above a pretuned angular speed.

15. The restraint system of claim 1, wherein the webbing spool includes a slot, the restraint system further comprising webbing extending through the slot.

16. The restraint system of claim 1, further comprising a spring coupled to the webbing spool and coupled to the retractor housing, wherein the spring is a coil spring.

17. The restraint system of claim 1, further comprising a spring coupled to the webbing spool and coupled to the retractor housing, wherein the spring is preloaded to apply a torque to the webbing spool in a retractive direction.

18. The restraint system of claim 17, wherein rotation of the wire spool in an extractive direction opposite the retractive direction tends to pull the wire through the die.

19. A restraint system comprising:
    a retractor housing;
    a webbing spool rotatably coupled to the retractor housing and defining an axis of rotation;
    a wire spool lockable to the webbing spool;
    a die fixed relative to the retractor housing; and
    a wire fixed to the wire spool and engaged with the die;
    wherein the die includes an inlet and an outlet;
    the wire includes a first segment extending from the wire spool to the outlet of the die and a second segment extending from the inlet of the die; and
    the die is sized to squeeze the second segment to a smaller cross-sectional area of the wire as the second segment of the wire passes through the die.

20. A restraint system comprising:
    a retractor housing;
    a webbing spool rotatably coupled to the retractor housing and defining an axis of rotation;
    a wire spool lockable to the webbing spool;
    a die fixed relative to the retractor housing; and
    a wire fixed to the wire spool and engaged with the die;
    wherein the die includes an inlet and an outlet;
    the wire includes a first segment extending from the wire spool to the outlet of the die and a second segment extending from the inlet of the die;
    the wire includes a third segment extending from the second segment; and
    the third segment has a different cross-sectional area than the second segment.

21. A restraint system comprising:
a retractor housing;
a webbing spool rotatably coupled to the retractor housing and defining an axis of rotation;
a wire spool lockable to the webbing spool;
a die fixed relative to the retractor housing; and
a wire fixed to the wire spool and engaged with the die;
wherein the die includes an inlet and an outlet;
the wire includes a first segment extending from the wire spool to the outlet of the die and a second segment extending from the inlet of the die; and
the wire is unattached from the inlet of the die through an end of the wire.

* * * * *